United States Patent [19]
Birth et al.

[11] Patent Number: 5,678,199
[45] Date of Patent: Oct. 14, 1997

[54] TRANSCEIVER WITH CONTROLLED TRANSMIT/RECEIVE IMPEDANCE SWITCHING DEVICE

[75] Inventors: Winfried Birth; Christopher Marshall; Erich Saur; Holger Morbitzer, all of Nürnberg, Germany

[73] Assignee: U.S. Philips Corporation, New York, N.Y.

[21] Appl. No.: 629,685

[22] Filed: Apr. 9, 1996

Related U.S. Application Data

[63] Continuation of Ser. No. 414,175, Mar. 29, 1995, abandoned, which is a continuation of Ser. No. 86,972, Jul. 2, 1993, abandoned.

[30] Foreign Application Priority Data

Jul. 7, 1992 [DE] Germany .................. 42 22 190.0

[51] Int. Cl.⁶ .................................................. H04B 1/46
[52] U.S. Cl. .................. 455/80; 455/82; 455/83; 333/101
[58] Field of Search .................. 455/78, 79, 80, 455/81, 82, 83, 127; 327/400, 403; 333/101, 103, 124

[56] References Cited

U.S. PATENT DOCUMENTS

| | | | |
|---|---|---|---|
| 4,633,073 | 12/1986 | Selin et al. | 455/78 |
| 5,023,935 | 6/1991 | Vancraeynest | 455/80 |
| 5,054,114 | 10/1991 | Erickson | 455/78 |
| 5,193,218 | 3/1993 | Shimo | 455/81 X |
| 5,212,885 | 5/1993 | Schumacher | 455/80 X |
| 5,257,411 | 10/1993 | Minasi | 455/80 |

FOREIGN PATENT DOCUMENTS 0446050  9/1991  European Pat. Off. .

OTHER PUBLICATIONS

Circuit Ideas, Wireless World, vol. 8, No. 1469, Jan., 1975, p. 12.

Primary Examiner—Edward F. Urban

[57] ABSTRACT

A transmit/receive radio set having a transmitter output stage, a receiver input stage, and an antenna switching device for change-over between transmission and reception by a single antenna. Two impedance transformers are provided at the output of the transmitter output stage. A switching circuit effects a change-over of the output impedance of the transmitter output stage during transmission and reception by controlling the impedance of at least one of the impedance transformers.

6 Claims, 1 Drawing Sheet

TRANSCEIVER WITH CONTROLLED TRANSMIT/RECEIVE IMPEDANCE SWITCHING DEVICE

This is a continuation of application Ser. No. 08/414,175, filed Mar. 29, 1995, now abandoned which is a continuation of application Ser. No. 08/086,972, filed Jul. 2, 1993, now abandoned.

BACKGROUND OF THE INVENTION

1. Field of the Invention

This invention relates to a radio set with an antenna switching device for alternate transmission and reception, comprising a transmitter output stage and a receiver input stage.

2. Description of the Related Art

With alternating transmission and reception, either transmission or reception takes place. In the new Pan-European mobile radio system the mobile radio sets are operated what is commonly referred to as a burst mode, in which the digital speech or data signals are compressed with time, so that they can be transmitted or received respectively, in discrete, time-division time slots. In contrast to what is commonly referred to as full-duplex systems, in which one antenna is used as a transmitting and at the same time as a receiving antenna, the antenna for radio sets which alternately operate in the transmitting and the receiving mode are selectively coupled to the transmitter output stage or to the receiver input stage via a switching device in accordance with the mode of operation required.

EP 0446050 A2 has disclosed, for example, a transmission/reception switching apparatus in which at least four λ/4 waveguides and two switching diodes are arranged so that, when the diodes are switched over, a transmitter output stage or a receiver input stage, as required, can be connected in the high-frequency region to a jointly used transceiver antenna. This makes use of prior art transformation properties of the λ/4 waveguides; namely, an input impedance present at one end of a λ/4 waveguide is transformed into a different output impedance at the other end thereof in dependence on the electrical properties of the λ/4 waveguide, which properties can be selected by an associated selection of the geometrical dimensions of the λ/4 waveguide. For switching over the antenna, the λ/4 waveguide property is used, i.e. that a short-circuited input is transformed into an open circuit at the other end of the waveguide and, conversely, an open input produces a short-circuit at the other end of the waveguide. In this manner a HF-signal present at an open input is not damped by the short-circuit at the other end of the λ/4 waveguide.

Such prior art circuit arrangement uses PIN diodes requiring a switching current of the order of several mA for optionally creating either short-circuited or open inputs. This current forms a considerable part of the power consumption of the receiver in battery-operated hand-held radio equipment, so that the available play time of the radio set is considerably reduced.

SUMMARY OF THE INVENTION

It is an object of the present invention to reduce the power consumption in a radio set with an antenna switching device for alternate transmission and reception. The number of components is also to be reduced to save volume.

This object is achieved with a radio set of this type, in that at least two impedance transformers are arranged at the output of the transmitter output stage, and switching means are provided which effect a change-over between transmission and reception by producing a change of the output impedance of the transmitter output stage.

Advantageously, the two impedance transformers are λ/4 waveguides, one λ/4 waveguide being connected to the transmitter output stage transform the output impedance thereof in the transmitting mode to an intermediate value, preferably the antenna impedance value. The second λ/4 waveguide is connected between the antenna and the first λ/4 waveguide, and has a characteristic impedance corresponding to the impedance of the antenna. In this manner, when the transmitter output stage is in the transmitting mode its output impedance is adapted to the antenna and so the output power of the transmitter output stage is fully transferred to the antenna. For a change-over to the receiving mode, appropriate switching means change the output impedance of the transmitter output stage to a high-impedance state. Thus, as a result of the two λ/4 transformations there will be a high-valued input resistance of the λ/4 waveguide connected to the antenna. The signals received from the antenna are thereby damped insignificantly if at all by the high-impedance transmitter branch, and so reach substantially exclusively the receiver input stage.

In this manner, at least in the transmitter branch, no additional switching current is necessary for a PIN diode, so that even in the case where a PIN diode switch-over is employed in the receiver branch, there is still a saving of total current consumption.

The transition of the output impedance of the transmitter output stage to the high-impedance state can be effected, for example, by simply switching off the power supply to the transmitter output stage.

This circuit variant provides a particularly simple solution for changing the output impedance of the transmitter output stage. Such impedance becomes relatively high-valued when the power supply is switched off, and as shown by actual measurements is often sufficiently high so that further measures concerning the circuitry are no longer necessary.

Alternatively, the high-valued state can also be realized by producing a cut-off voltage in the bias voltage circuit of the transmitter output stage. Such a bias voltage circuit is already available for transmitter control in customary radio sets so that no additional circuitry is needed.

In general, an adequate damping value between the transmitter output stage and receiver input stage can be provided by the two impedance transformers. However, if an even greater damping value is needed, still more impedance transformer, depending on the required damping value, can be installed. Such transformers, however, require additional switching current, for example, for PIN diode switch-overs.

In a further embodiment a filter is inserted between the antenna and the receiver.

This is especially advantageous in the case of different transmitter and receive frequencies. Since a bandpass filter tuned to the receive frequency is customarily included between the antenna and the receiver, such filter may also be arranged to have a high impedance at the transmitter frequency, i.e., in the transmission band. As a result, the power produced by the transmitter output stage during transmission is largely radiated by the antenna and the receiving section is protected from being damaged thereby. The receiving section therefore does not require additional switching current either, achieving a saving on components as compared to the prior art.

In another embodiment an impedance transformer is inserted before the receiver input stage, and before or in the receiver input stage a switching current controlled switching element is provided for switching over between transmission and reception.

This embodiment is especially suitable for applications in which the receiver and transmitter frequency is the same or substantially the same. As a result, a sufficient blocking operation can be achieved for the change-over from transmission to reception.

It is particularly advantageous to utilize an input transistor arranged in the receiver input stage as a switching current controlled switching element. The switching current can be applied to the base of the input transistor and thus switch through the base-emitter path of the transistor. In this manner the input of the receiver input stage is short-circuited. A single λ/4 transformation achieves a high input resistance of the λ/4 waveguide arranged in the receiver branch, so that during transmission the transmitter power does not reach the input of the receiver input stage. The combined use of the input transistor as a switching element saves an otherwise additionally required PIN diode. This reduces the required space and power consumption, which leads to a reduction of costs.

According to a particularly advantageous embodiment the switching current necessary for cutting off the receiver is also provided for supplying current to the transmitter output stage or to a transmitter preamplifier preceding the transmitter output stage. The switching current necessary for the switching element is only required during transmission. By additionally using this switching current as a current supply to the transmitter output stage and/or a transmitter driver stage, the switching current is not lost. It is rather used for the power supply, which is necessary in any case, of the transmitter or a part thereof in the transmitting mode, so that there is no extra power consumption of the switching element as a result of the dual use of the switching current.

BRIEF DESCRIPTION OF THE DRAWINGS

The invention will now be further described with reference to the embodiments shown in the drawings, in which.

DESCRIPTION OF THE PREFERRED EMBODIMENTS

Figure 1:
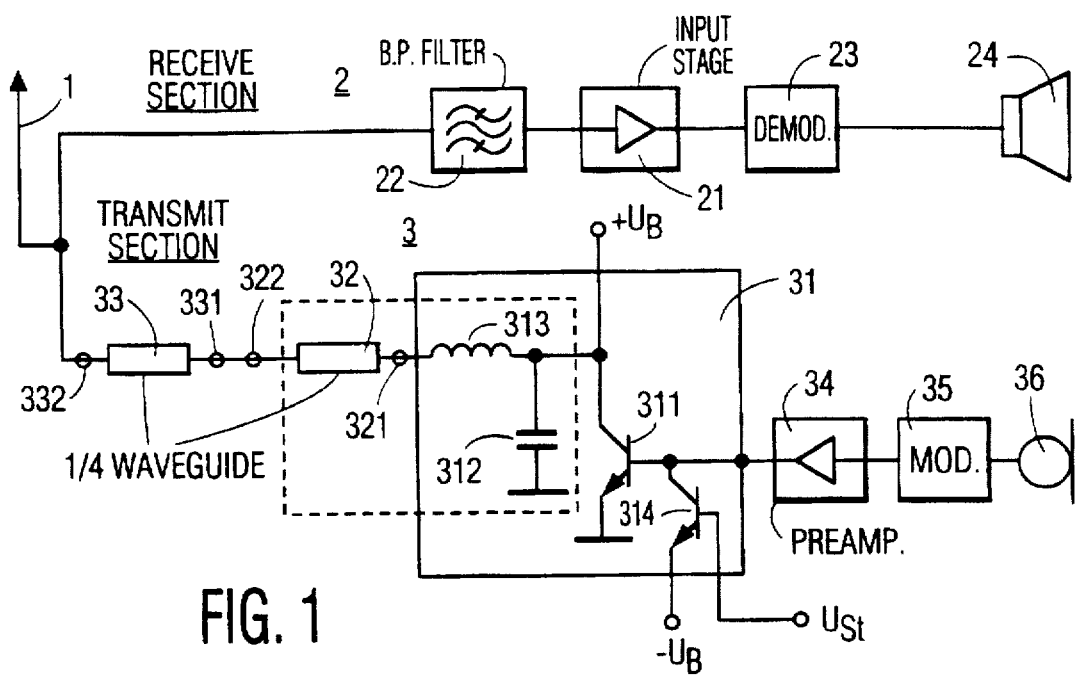
FIG. 1 shows an arrangement for antenna switching with different receive and transmitter frequencies.

The embodiment shown in FIG. 1 is the HF section of a radio set having both transmitting and receiving modes. A receiving section 2 and a transmitting section 3 are connected to a jointly used antenna 1. A bandpass filter 22 is connected between the antenna 1 and receiver input stage 21. The bandpass filter 22 is that it passes only the receive frequencies and reflects in a high impedance state the transmitter frequencies (i.e., bandpass filter 22 reflects in a high impedance state signals having frequencies different from or outside the band of receive frequencies). In the transmitting mode the transmitter power produced by the transmitting section 3 is sufficiently damped by the bandpass filter 22, so that it cannot damage the receiver input stage 21. At the same time the adaptation of the output impedance of the transmitting section 3 to the antenna 1 is maintained.

This circuit variant, which comprises an extremely simple structure in the receiving section, is thus especially suitable for radio sets in which the transmitter and receiver frequencies are selected to be different.

For completeness, FIG. 1 includes a circuit block 23 for further signal processing on the receiving side and a loudspeaker 24 connected thereto. This further signal processing, such as, for example, intermediate frequency conversion, demodulation and digital signal processing in the low-frequency range, are known in the art and do not relate to the essence of this invention and so are shown only schematically as the circuit block 23.

Circuit block 35 provides processing of the speech signal coming from a microphone 36 and modulation of the transmitter frequency with this speech signal. The modulated send signal is applied to a transmitter preamplifier 34. From this transmitter preamplifier 34 the preamplified send signal reaches a transmitter output stage 31.

In principle, any circuit variant of a transmitter output stage comprising transistors or other active elements which can be switched to the high-impedance state is suitable for use in the invention. To simplify the description of the invention, the embodiment in FIG. 1 shows only a transmitter output stage transistor 311 in the transmitter output stage 31. The transmitter output stage transistor 311 can, during reception, be switched to the non-active high impedance state by means of a switching transistor 314.

A first λ/4 waveguide 32 is connected with its first terminal 321 to the collector of the transmitter output stage transistor 311. The set capacitance 312 and bonding wire inductance 313, which can be measured at the output of the transmitter output stage transistor 311, are taken into consideration for the dimensioning of this first λ/4 waveguide 32. This first λ/4 waveguide 32 has an impedance value Zw in accordance with the following formula $$Z_W = \sqrt{Z_{Ant} * Z_{Trans}}$$

and thus adapts the transistor impedance $Z_{Trans}$ to the antenna impedance $A_{ant}$. The λ/4 waveguide may physically be a strip line, coaxial cable or an inductance-capacitance network. A first terminal 331 of a second λ/4 waveguide 33 is connected to a second terminal 322 of the first λ/4 waveguide 32. The second terminal 332 of the second λ/4 waveguide 33 is connected to the antenna 1.

The second λ/4 waveguide 33 has a characteristic impedance which is the same as the base impedance of the antenna 1. This impedance is customarily of the order of 50 to 75 ohms, but other antenna impedances may be adapted as required in accordance with the principle of the invention.

In this manner the transmitter output stage, during transmission, is adapted to the input impedance of the second λ/4 waveguide 33. The characteristic impedance of the second λ/4 waveguide 33 is identical, as described, with the antenna impedance, so that the full transmitter power of the transmitting stage 31 is conveyed to the antenna 1. The bandpass filter 22 of the receiving section 2 only slightly damps the transmitted signal.

During reception, the first switching transistor 314 switches the transmitter output stage transistor 311 to a high impedance state. The first λ/4 waveguide 32 is thus terminated in a high-impedance state at its first terminal 321. With a first transformation effected by the characteristic impedance of the first λ/4 waveguide 32, this high impedance termination results in a lower impedance termination at the second terminal 322 of the first λ/4 waveguide 32. This low-impedance termination is at the same time a low-impedance termination of the second λ/4 waveguide 33 at its first terminal 331. With another transformation of the characteristic impedance of the λ/4 waveguide in the second λ/4 waveguide 33, the low-impedance termination at the second terminal 322 of the second λ/4 waveguide 33 is again transformed into a high-impedance termination as its first terminal 322. In this manner the input impedance of the transmitting section 3 is high valued.

As a result of parasitic resistance of the transmitter output stage transistor 311 in a cut-off state, the ideal case of an infinite impedance at the first terminal 321 of the first λ/4 waveguide 32 cannot be achieved. However, measurements have shown that with commercially available transistors a terminating impedance of the order of 200 to 300 ohms can be achieved without specific circuitry. With this termination substituting for an ideal infinite impedance there can be achieved that the input signals received from the antenna 1 are only damped to the order of 1 dB by the transmitting section. This damping value will suffice in most cases. However, if still lower damping values were required, it is known to those skilled in the art how to bring the transmitter output stage transistor 311 to a higher output impedance in the cut-off state.

Figure 2:
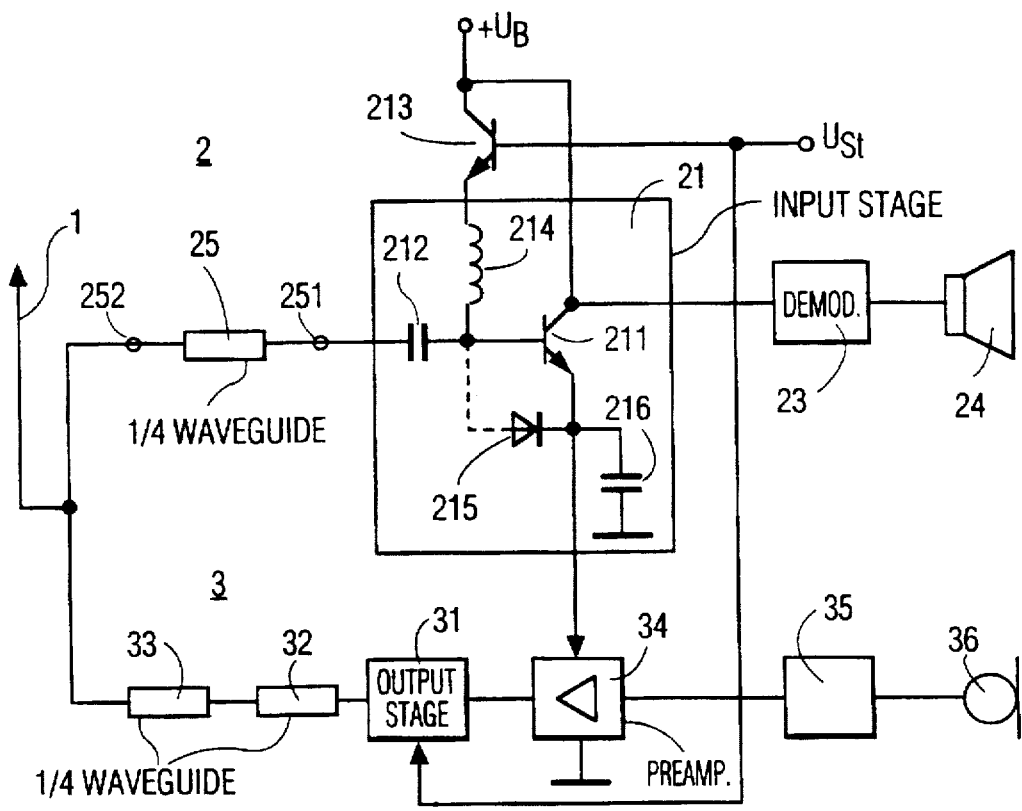
FIG. 2 shows an arrangement for antenna switching with equal transmitter and receive frequencies.

FIG. 2 shows an exemplary embodiment of the invention which is particularly suitable for radio sets in which transmitter and receive frequencies are selected to be the same. As a substitution for or in addition to a bandpass filter (not shown), a third λ/4 waveguide 25 is inserted between antenna 1 and the input of the receiver input stage 21, the first terminal 251 of the waveguide being connected to the receiver input stage 21 and the second terminal 252 to the antenna 1.

The receiver input stage 21 comprises a HF input stage transistor 211 to which can be applied, via a coupling capacitor 212, the input signals coming from the antenna 1. Via a second switching transistor 213, also arranged as a current switch, a switching current can be applied to the base of the HF input stage transistor 211. A HF choke 214 then prevents HF input signals from being damped in the receiving mode by the switching transistor 213. The emitter of the HF input stage transistor 211 is grounded via a capacitor 216.

As long as no control voltage $U_{St}$ or a negative control voltage $U_{St}$ is available, the radio set is in the receiving mode. In this mode the receiving end λ/4 waveguide 25, whose characteristic impedance matches the antenna impedance, has only the function of conductor. It is also possible to use the λ/4 waveguide 25 for adapting the receiver input stage 21 to the antenna 1, in that its characteristic impedance is selected accordingly. Ideally, the input signal of the antenna 1 is thus completely applied to the receiver input stage 21 in the receiving mode.

In the transmitting mode a control voltage $U_{St}$ switches the receiving end switching transistor 213 to the conductive state. The voltage present on the base-emitter path of the input stage transistor 211 is so large that it also switches such path to the highly conductive state. In this manner the switching current flows from the operating voltage $+U_B$ via the receiving end switching transistor 213, via the HF choke 214 and via the base-emitter path of the input stage transistor 211, which consequently becomes a very low-impedance path. Thus, the receiving end λ/4 waveguide 25 has a low-impedance termination at its first terminal 251. Consequently, the second terminal 252 of the λ/4 waveguide 25 has a high impedance. The transmitting power is thus largely completely conveyed from the transmitting stage 31 via the λ/4 waveguides 32 and 33, analogously with the first embodiment, to the antenna 1.

In this embodiment the switching current is applied to the transmitter preamplifier 34 as a supply current via the base-emitter path of the input stage transistor 211. As a result, this current is used very economically in the transmitter. Alternatively, the base-emitter path of the input stage transistor 211 can be connected in parallel with an additional diode 214 as represented in a dashed line. The forward biased voltage of this diode can be selected to be higher than the forward biased voltage of the base-emitter diode of the input stage transistor 211, so that the additional diode 215 will not influence the operation of the HF input stage transistor 211 in the receiving mode. This additional diode 214 can be integrated with the input stage transistor 211 on the same chip.

We claim:

1. A radio set having a transmitter section and a receiver section which are alternately switched to a common antenna in order to alternate between use of said radio set for transmission or reception; characterized in that the transmitter section comprises:

an output stage for amplifying a radio frequency (RF) signal to be transmitted within a transmit frequency band, an amplified RF signal being produced at an output thereof; said output stage having an output impedance which switches from an operating impedance value to a high impedance value in response to a switching signal applied to said output stage when said radio set is used for reception;

a first and a second waveguide connected in series, each having a length which is an odd multiple of a quarter-wavelength of the RF signal to be transmitted, the first waveguide further being connected to the output of said output stage, the second waveguide further being connected to said antenna;

the first waveguide during transmission having an impedance which provides matching between the operating impedance value of said output stage and the impedance of said antenna, the second waveguide having an impedance which matches the impedance of said antenna; the first waveguide further serving to convert the high output impedance value of said output stage during reception to a low impedance value, and the second waveguide further serving to convert said low impedance value to a very high impedance value at said antenna during reception;

said radio set further characterized in that the receiver section comprises:

an input stage for amplifying an RF signal received at an input thereof and within a receive frequency band, an amplified RF signal being produced at an output thereof; and a bandpass filter connected between the input of said input stage and said antenna for passing only signals within the receive frequency band and reflecting signals having frequencies outside of the receive frequency band with a high impedance value at said antenna;

wherein the transmit frequency band is different from the receive frequency band, and whereby when said radio set is used for transmission the receiver section thereof is isolated from said antenna by the high impedance value of said bandpass filter as seen at said antenna and whereby when said radio set is used for reception the transmitter section thereof is isolated from said antenna by the very high impedance value of said output stage as seen at said antenna;

further wherein switching off or on a power supply to said transmitter output stage alternates the impedance value of said output stage between (i) a high impedance value during use of said radio set for reception or (ii) the operating impedance value during use of said radio set for transmission, respectively.

2. The radio set as claimed in claim 1, wherein said output stage comprises a transistor amplifier and a switching transistor connected thereto which receives the switching signal and in response thereto, during reception, supplies a bias voltage to said transistor amplifier which renders it substantially non-conductive.

3. The radio set as claimed in claim 1, wherein the transmit frequency band is the same as the receive frequency band, and said input stage having an input impedance which switches from an operating impedance value to a low impedance value in response to a second switching signal applied to said input stage when said radio set is used for transmission; and wherein the receiver section further comprises:
- a current controlled switching element arranged in connection with said input stage for receiving the second switching signal and switching the operating impedance value of the receiver section between the low impedance value during transmission and the operating impedance value during reception;
- a third waveguide connected between an input of said bandpass filter and said antenna, having a length which is an odd multiple of a quarter-wavelength of the received RF signal; said third waveguide serving to convert the low input impedance value of said input stage during transmission to a high impedance value at said antenna and to convert the operating impedance value of said input stage during reception to a low impedance value at said antenna;

whereby when said radio set is used for transmission the receiver section thereof is isolated from said antenna by the high impedance value of said input stage as seen at said antenna.

4. The radio set as claimed in claim 3, wherein said input stage comprises a second transistor amplifier and a second switching transistor connected thereto which receives the second switching signal and in response thereto, during transmission, supplies a switching current to the base-emitter path of said second transistor amplifier which renders said second transistor amplifier highly conductive.

5. The radio set as claimed in claim 4, further comprising a diode connected in parallel with the base-emitter path of said second transistor amplifier.

6. The radio set as claimed in claim 4, further comprising a conductor connecting the emitter of said second transistor amplifier in the receiver section to the transmitter section, so that the switching current supplied to the base-emitter path of said second transistor amplifier further provides a supply current to the transmitter section, during transmission.

* * * * *